United States Patent [19]
Viau et al.

[11] Patent Number: 5,925,166
[45] Date of Patent: Jul. 20, 1999

[54] PROCESS FOR OBTAINING IRON OR IRON-BASED POWDERS BY ORGANIC LIQUID PHASE PRECIPITATION

[75] Inventors: Guillaume Viau; Fernand Fievet; Françoise Fievet, all of Paris, France

[73] Assignee: Commissariat a l'Energie Atomique, Paris, France

[21] Appl. No.: 08/776,197

[22] PCT Filed: Jul. 27, 1995

[86] PCT No.: PCT/FR95/01010

§ 371 Date: Jan. 29, 1997

§ 102(e) Date: Jan. 29, 1997

[87] PCT Pub. No.: WO96/04088

PCT Pub. Date: Feb. 15, 1996

Related U.S. Application Data

[30] Foreign Application Priority Data

Jul. 29, 1994 [FR] France ................................. 94 09437

[51] Int. Cl.⁶ ....................................................... B22F 9/20
[52] U.S. Cl. .................................. 75/369; 75/371; 75/721
[58] Field of Search .............................. 75/347, 351, 362, 75/369, 371, 374, 721

[56] References Cited

U.S. PATENT DOCUMENTS

| | | | |
|---|---|---|---|
| 4,059,463 | 11/1977 | Aonuma et al. | 75/347 |
| 4,349,380 | 9/1982 | Pytlewski et al. | 75/721 |
| 4,681,623 | 7/1987 | Okajima et al. | 75/351 |
| 5,260,132 | 11/1993 | Nakazumi et al. | 75/369 |
| 5,759,230 | 6/1998 | Chow et al. | 75/362 |

FOREIGN PATENT DOCUMENTS

| | | |
|---|---|---|
| 113281 | 7/1984 | European Pat. Off. . |
| 154548 | 9/1985 | European Pat. Off. . |
| 367159 | 5/1990 | European Pat. Off. . |

*Primary Examiner*—George Wyszomierski
*Attorney, Agent, or Firm*—Oblon, Spivak, McClelland, Maier & Neustadt, P.C.

[57] ABSTRACT

The present invention relates to a process for obtaining an iron powder, which may incorporate nickel and/or cobalt, by organic liquid phase precipitation. This process comprises a stage of introducing metal precursors into a basic polyol or optionally simple alcohol solution, a stage of heating said reaction medium to obtain a metal precipitate and a stage of recovering and treating said precipitate to obtain the desired powder.

16 Claims, No Drawings

500
PROCESS FOR OBTAINING IRON OR IRON-BASED POWDERS BY ORGANIC LIQUID PHASE PRECIPITATION

BACKGROUND OF THE INVENTION

1. Field of the Invention

The present invention relates to a process for obtaining iron or iron-based powders by organic liquid phase precipitation. The powders obtained are in finely divided form and are constituted by size-homogeneous, submicronic particles.

2. Discussion of the Background

There are considerable industrial needs for iron-based, fine powders, either as precursors for the production of mechanical parts by sintering, or for the production of composite materials, or for use as such for electrostatic reprography.

In addition, ferromagnetic metals are used in powder form, as a function of the chemical composition and morphology of the particles, for magnetic reading or recording systems, as well as in granular materials having high microwave frequency magnetic losses.

Numerous processes are known for producing iron or iron-based powders and they call on various procedures. Among the methods for producing iron-based metal powders, two major classes must be differentiated, i.e. physical and chemical methods.

Physical methods, whose two main procedures involve grinding and atomizing, consist of a morphological transformation of iron already in metallic form. In most cases, the powders obtained by these processes are formed by particles having an average size exceeding about 10 $\mu$m and the particles have a random shape. Although atomization has the advantage compared with grinding of, under certain conditions, giving spherical powders, in both cases there is a very considerable size distribution. Such processes are generally unsuitable for producing monodisperse powders.

Chemical methods involve a chemical transformation of a precursor into a metal powder and can take place in the solid, liquid or gaseous phase.

The solid or gaseous phase methods give powders with a high chemical purity, but generally with a wide particle size dispersion.

On excepting the electrochemical method, which consists of reducing iron salts in solution in contact with a rotary electrode by imposing a potential difference and which gives powders having a high chemical purity, but with no control concerning the shape and size of the particles, liquid phase chemical methods permit the production of fine powders, whose average particle size is approximately 1 or 0.1 $\mu$m with in addition a control of the morphology and a small size dispersion.

In chemical methods, a distinction must be made between two reaction types, namely decompositions and reductions.

Decomposition of carbonyl iron (by the liquid or gaseous process) to metallic iron powder gives spherical and relatively size-homogeneous powders of micronic or micronic dimensions, as a function of the operating conditions. The disadvantage of this method is that a large carbon monoxide volume is produced during the reaction. This method also does not permit the synthesis of iron-nickel or iron-cobalt polymetallic powders.

Among the chemical methods using the reduction phenomenon, reference is firstly made to reductions of solid iron oxides by various reducing agents. The Höganäs process uses coke for reducing the ground iron oxide. The powder obtained is formed from spongy particles, without any particular morphology and with an average size of a few dozen $\mu$m. Other processes use gaseous hydrogen involving high reaction temperatures. By controlling the morphology of the starting oxide powder, certain authors have been able in special cases to control the morphology of the reduced metallic powder.

Liquid phase reductions take place under much more gentle temperature and pressure conditions and the morphology of the powders obtained is independent of that of the precursors, because the first stage of this type of reaction is generally the dissolving of the precursors in a solvent. The reducing agent and the dissolved metal salts react in solution to give the metal, which precipitates. The control of the metal particle size is dependent on the process used and requires a control or monitoring of the different reaction stages.

Borohydrides are used in aqueous solution to reduce iron or cobalt salts to fine powders of a controlled size, but the thus formed powders are metal-boron alloys.

The reduction of metal salts in an organic liquid medium by alkali metals such as lithium or sodium can give powders of iron and other metals, but the particles produced apparently have no specific morphology.

EP-A113 281 describes a process for reducing metallic compounds in a liquid polyol medium. This process is known as the "polyol process". In this case there is no addition of a supplementary reducing agent, the polyol serving both as the solvent and the reducing agent. This process makes it possible to obtain metallic powders, particularly of cobalt and nickel, with a control of the size and shape of the particles. However, it does not permit the obtaining of iron in metallic form, either pure, or associated with nickel or cobalt.

SUMMARY OF THE INVENTION

The polypol process has numerous disadvantages, particularly with regards to the quality of the powders obtained. The inventors of the present invention have attempted to adapt the polyol process in such a way as to produce fine, iron-based, metallic powders. They have been successful in developing a method having numerous advantages. It is simple to implement, uses a liquid phase reaction under gentle temperature and pressure conditions and does not involve the addition of a supplementary reducing agent. Finally, it makes it possible to control the morphology of the powders formed. The submicronic size of the particles obtained, their limited size dispersion and their controlled morphology make them particularly interesting for sintering and for obtaining composite materials having high magnetic performance characteristics.

DETAILED DESCRIPTION OF THE PREFERRED EMBODIMENTS

According to a main variant of the invention, use is made of an alkaline polyol solution permitting the obtaining of iron by dismutation of iron (II) to iron (III) and metallic iron (oxidation degree 0). The presence of a strong base dissolved in the polyol makes possible said iron (II) dismutation reaction. The metallic iron precipitates, but the (III) iron species remain in solution, so that pure iron can be collected.

In the conventional polyol process, the metals are obtained by reducing precursors in solution. In the case of the invention, the reaction mechanism is consequently quite different from a reduction. During the coprecipitation of iron and another metal, cobalt or nickel, the method implemented makes it possible to bring about coincidence between two reaction mechanism types, dismutation and reduction, in order to form polymetallic powders.

Thus, the invention relates to a process for obtaining an iron powder optionally incorporating nickel and/or cobalt, by organic liquid phase precipitation, comprising the stages of:

introducing a precursor of iron with an oxidation degree (II) and optionally a precursor of nickel of oxidation degree (II) and/or a precursor of cobalt of oxidation degree (II) into a basic solution of polyol or a mixture of polyols to obtain a reaction medium, heating the reaction medium to a temperature permitting the elimination of the water and volatile products of the reaction medium and the obtaining of an iron precipitate optionally incorporating nickel and/or cobalt, recovering of the precipitate and treatment of said precipitate to obtain said powder.

The polyol used, e.g. ethylene glycol, propylene glycol or diethylene glycol, to give only the most common, are both solvents of precursors, the reaction medium of the dismutation of iron (II), reducing agents of the cobalt (II) and nickel (II) species and growth medium for the metal particles.

The alkaline polyol solution can be prepared beforehand by dissolving a strong base (e.g. soda or potash) in a polyol. The concentration of the base can be variable.

The precursors used are iron salts with an oxidation degree (II) not oxidized in iron (III), cobalt (II) and nickel (II) salts. These salts must at least be partly soluble in polyol so that the reaction can take place. Chlorides and acetates are e.g. good precursors.

The inventors have also found and this constitutes a secondary variant of the invention, that metallic particles of iron, nickel and iron-nickel can also be obtained in certain simple alcohols such as 1-pentanol or 1-octanol by dismutation of Fe(II) and/or reduction of Ni(II). Working also takes place in these simple alcohols in the presence of a strong base, e.g. NaOH. The Fe(III) produced during the dismutation is in the form $Fe_3O_4$, which is much less soluble under the temperature and basicity conditions of the medium in simple alcohols than in polyols. Therefore, in said simple alcohols, the iron or iron-nickel powders obtained still have the disadvantage of being mixed with particles of magnetite $Fe_3O_4$, whereas in the polyols used the Fe(III) remains in solution.

Thus, the invention also relates to a process for obtaining an iron powder optionally incorporating nickel, by organic liquid phase precipitation, comprising the stages of:

introducing a precursor of iron with an oxidation degree (II) and optionally a precursor of nickel with an oxidation degree (II) into a basic solution of simple alcohol or a mixture of simple alcohols in order to obtain a reaction medium, heating said reaction medium to a temperature at least equal to 100° C. optionally permitting the elimination of the water and volatile products of the reaction medium and the obtaining of an iron precipitate, optionally incorporating nickel, recovery of the precipitate and treatment of said precipitate to obtain said powder.

The invention also relates to the metallic powders obtained by the above process and in particular the metallic powders described hereinafter in the experimental part.

The invention will be better understood and other advantages and features will become more apparent from reading the following description given in an exemplified and non-limitative manner.

The powders are obtained by the precipitation of iron or the coprecipitation of different metals, in a liquid polyol medium or liquid simple alcohol, as a function of the particular case. The procedure is as follows. The precursor of the iron (or the mixture of precursors of the corresponding, desired metals) is introduced into a basic polyol solution (or simple alcohol, if necessary). This mixture is mechanically agitated or stirred and raised to a temperature equal to or below the boiling point of the polyol (or alcohol) at ambient pressure. It is kept at this temperature for a certain time. The water and volatile products of the reaction are eliminated from the reaction medium by distillation under atmospheric or reduced pressure. The metallic powder precipitates in the solution. Following the end of the reaction the solution is centrifuged. The powder collected is successively washed with alcohol, acidified water to eliminate the strong base and finally acetone to eliminate the water. The powder is dried at 50° C. in the oven or under reduced pressure.

The following examples 1 to 11 describe methods for obtaining powders of iron, iron-nickel, iron-cobalt and iron-cobalt-nickel according to the invention.

EXAMPLE 1

Obtaining an Iron Powder by Means of a Polyol

The starting product used is solid iron (II) chloride hydrate $FeCl_2$, $4H_2O$ marketed by Prolabo. 15 g of this product are suspended in 400 $cm^3$ of propylene glycol (or 1,2-propane-diol) in a spherical reactor. To said suspension are added in pellet form 20 g of sodium hydroxide NaOH. The reactor is placed in a heating mantle. It is surmounted by a cover, to which is fitted a distillation column. The suspension is mechanically agitated. The mixture is heated to boiling and kept at the boiling point for 4 hours. The water is distilled during heating. After cooling the suspension, the powder is separated from the solution by centrifuging and washed several times with alcohol. Examined by X-ray diffraction, the powder obtained is a mixture of sodium chloride NaCl and Fe-α phase crystalline iron. The sodium chloride is eliminated by washing with water. The final powder is highly magnetic and a further X-ray examination reveals that there is a pure iron powder. Chemical analysis of this powder reveals the presence of carbon and oxygen at weight levels of respectively 0.5 and 2%. Scanning microscopy reveals that the powder obtained is constituted by fine, non-agglomerated, isotropic particles, which are relatively size-homogeneous and with an average diameter of 0.4 μm.

EXAMPLE 2

Obtaining an Iron Powder by Means of a Polyol

In an identical manner, the same iron (II) chloride tetrahydrate quantity is suspended with 32 g of sodium hydroxide in 400 $cm^3$ of ethylene glycol (or 1,2-ethane-diol). The metallic iron powder obtained after a treatment identical to that of example 1 is constituted by agglomerated, very fine particles with a mean diameter of 0.1 μm.

EXAMPLE 3

Obtaining an Iron Powder by Means of a Polyol

In an identical manner, the same quantity of iron (II) chloride tetrahydrate is suspended with 32 g of sodium hydroxide in 400 cm³ of propylene glycol. The suspension is heated and kept at 140° C. for 4 hours and under reduced pressure, which makes it possible to eliminate the water by distillation. The iron powder obtained is constituted by fine, slightly agglomerated particles with an average diameter of 0.4 μm.

EXAMPLE 4

Obtaining an Iron Powder by Means of a Simple Alcohol 10 g of sodium hydroxide are dissolved in 250 cm³ of 1-pentanol, heating the solution to 105° C. To said solution are added 9.5 g of iron (II) chloride tetrahydrate in solid form. The mixture is kept at 105° C. for 30 minutes. The powder collected by centrifuging and repeated washing operations with ethanol, water and then acetone and analyzed by X-ray diffraction, is constituted by a mixture of magnetite $Fe_3O_4$ and Fe-α in comparable proportions, being constituted by submicronic particles.

EXAMPLE 5

Obtaining an Powder of Iron by Means of a Simple Alcohol

In the same way as in the previous example, the same iron (II) chloride tetrahydrate quantity is dispersed in a solution of sodium hydroxide in 1-octanol and with the same concetration (10 g in 250 cm³). The mixture is kept at 115° C. for 30 minutes. The powder obtained is a mixture of $Fe_3O_4$ and Fe-α, being formed by submicronic particles.

EXAMPLE 6

Obtaining an Iron-Nickel Powder by Means of a Polyol

Two solutions are prepared. The first contains a mixture of 8.5 g of iron (II) chloride $FeCl_2$, $4H_2O$ and 10 g of nickel (II) chloride $NiCl_2$, $6H_2O$ dissolved in 200 cm³ of propylene glycol (the molar proportions Fe(II)/Ni(II) are consequently 50:50). The second contains 20 g of sodium hydroxide in 200 cm³ of propylene glycol. The two solutions are mixed cold and the overall mixture is treated as in the preceding examples, i.e. heated to the boiling point for a few hours with distillation of water and light organic products resulting from the chemical reaction. The metallic powder obtained is successively washed with ethanol, water and acetone.

The chemical analyses show that the iron and nickel are present in said powder in final weight proportions Fe:Ni= 25:75. The X-ray diffraction examination shows a single crystalline phase of the c.f.c. type. Observed in electron microscopy, the powder appears to be formed by spherical particles, which are of a very uniform size and which are not agglomerated. The average diameter of the particles and the standard deviation of the distribution of sizes, determined by image analysis on approximately 250 particles, give the respective values $d_m$=130 nm and σ=18 nm. The X-ray analyses show that each particle contains iron and nickel in the proportions 25:75, a mapping of the two elements not revealing segregation in the particles. Mössbauer spectroscopic examination shows an average local environment of iron atoms corresponding to the overall composition. The different characterizing methods would appear to indicate the existence of a solid solution of the two elements in the particles.

EXAMPLE 7

Obtaining an Iron-Nickel Powder by Means of a Polyol

A solution containing 8.5 g of iron (II) chloride $FeCl_2$, $4H_2O$ and 10 g of nickel (II) chloride $NiCl_2$, $6H_2O$ dissolved in 200 cm³ of ethylene glycol is mixed cold with a solution containing 32 g of sodium hydroxide dissolved in 200 cm³ of ethylene glycol. The mixture is treated in the same way as in the previous example. The metallic powder obtained contains the elements iron and nickel in the following weight proportions: Fe:Ni=18:82. Scanning electron microscopic examination reveals a powder constituted by spherical particles with a uniform size and which are not agglomerated, with a standard deviation of σ=15 m and a mean diameter $d_m$=100 nm.

EXAMPLE 8

Obtaining an Iron-Nickel Powder by Means of a Polyol

A solution containing 8.5 g of iron (II) chloride $FeCl_2$, $4H_2O$ and 10.5 g of nickel (II) acetate $Ni(CH_3CO_2)_2$, $4H_2O$ dissolved in 200 cm³ of ethylene glycol is mixed cold with a solution containing 32 g of sodium hydroxide dissolved in 200 cm³ of ethylene glycol. The powder obtained after treating the mixture at 175° C. for 1 hour is constituted by spherical, size-homogeneous, non-agglomerated particles with a mean diameter $d_m$=200 nm.

EXAMPLE 9

Obtaining an Iron-Nickel Powder by Means of a Simple Alcohol

At ambient temperature dispersion takes place in 250 cm³ of 1-octanol of 10 g of nickel (II) acetate $Ni(CH_3CO_2)_2$, $4H_2O$, 8 g of iron (II) chloride $FeCl_2$, $4H_2O$ and 5 g of sodium hydroxide. The mixture is heated to the boiling point (190° C.) and kept at this temperature for 4 hours. The powder obtained, washed with alcohol and then water, is a mixture of $Fe_3O_4$ and a metallic phase of structure c.f.c., characterized by a crystalline parameter very different from that of nickel. The powder is constituted by agglomerated submicronic particles with little size uniformity.

EXAMPLE 10

Obtaining an Iron-Cobalt Powder by Means of a Polyol

A solution containing 11.2 g of iron (II) chloride $FeCl_2$, $4H_2O$ and 6.8 g of cobalt (II) chloride $CoCl_2$, $6H_2O$ dissolved in 200 cm³ of ethylene glycol is mixed cold with a solution containing 32 g of sodium hydroxide dissolved in 200 cm³ of ethylene glycol. The mixture is treated as in the previous examples. The metallic powder obtained contains the elements iron and cobalt in the following weight proportions Fe:Co=20:80. It is constituted by agglomerated particles, with little size uniformity and of average size 0.5 μm. The powder has a saturation magnetization of 155 uem/g.

EXAMPLE 11

Obtaining an Iron-Cobalt-Nickel Powder by Means of a Polyol

A solution containing 5.6 g of iron (II) chloride $FeCl_2$, $4H_2O$, 10.5 g of cobalt (II) chloride $CoCl_2$, $6H_2O$ and 2.7 g of nickel (II) chloride $NiCl_2$, $6H_2$ dissolved in 200 cm³ of ethylene glycol is mixed cold with a solution containing 32 g of sodium hydroxide dissolved in 200 cm³ of ethylene glycol. The powder obtained after treating the mixture at 195° C. for 3 hours contains iron, cobalt and nickel in respective weight proportions 13, 67 and 20%. The powder is formed by spherical, size-uniform, non-agglomerated particles with an average diameter $d_m=120$ nm.

The powders obtained, particularly those obtained by using polyols, are constituted by quasi-spherical, isotropic particles, which are only slightly agglomerated. They are generally of submicronic size and have a very considerable size uniformity. It is reasonable to speak of monodisperse powders. These powders are not pyrophoric, an oxide layer protecting them against violent oxidation.

The iron powders are characterized by their X-ray diffraction diagram and have a centred, cubic, crystalline structure, namely the Fe-α phase. These powders are ferromagnetic and the measurement of their saturation magnetization gives values close to those of solid materials. The proportion of impurities is relatively low and it is possible to carry out a heat treatment under gaseous hydrogen at relatively low temperatures in order to reduce the carbon and oxygen levels without sintering the powders.

The polymetallic powders have in X-ray diffraction one or several crystalline phases, as a function of their chemical composition. Their Mössbauer spectra show that the iron in said powders is at oxidation degree 0 and has a ferromagnetic coupling. The measurement of their saturation magnetization gives values close to those of solid materials. X-ray microanalysis demonstrates that each particle contains the different elements in the overall proportions of the powder and, as a function of the powder composition, there can be a more or less marked composition gradient between the core and exterior of the particles.

We claim:

1. A process of making an iron precipitate consisting essentially of:
   dissolving Fe(II) salts in a basic solution of a polyol obtained by dissolving a base in a polyol;
   heating said solution to remove water; and
   recovering a metallic iron precipitate.

2. Process according to claim 1, characterized in that the polyol used is ethylene glycol, or propylene.

3. The process according to claim 1, further comprising: treating said precipitate to obtain a metallic iron powder.

4. The process according to claim 3, wherein said treating of said precipitate comprises:
   washing with an alcohol;
   washing with acidified water;
   washing with acetone; and
   drying in an oven at less than ambient pressure.

5. The process according to claim 1, additionally dissolving salts of a metal ion selected from the group consisting of Co(II), Ni(II), and a mixture thereof in said basic solution of a polyol, and additionally recovering a precipitate of said metal ion.

6. The process according to claim 1, wherein said salts are selected from the group consisting of chloride salts, acetate salts, and mixtures thereof.

7. The process according to claim 1, wherein said basic solution of a polyol comprises sodium hydroxide or potassium hydroxide.

8. The process according to claim 1, wherein said basic solution of a polyol is the sole reducing agent for said Fe(II).

9. A process of making an iron precipitate comprising:
   dissolving Fe(II) salts in a basic solution of a simple alcohol obtained by dissolving a base in a simple alcohol;
   heating said solution to at least 100° C. to remove water; and
   recovering a metallic iron precipitate.

10. Process according to claim 9, characterized in that 1-pentanol or 1octanol is used as the alcohol.

11. The process according to claim 9, further comprising: treating said precipitate to obtain a metallic iron powder.

12. The process according to claim 11, wherein said treating of said precipitate comprises:
    washing with an alcohol;
    washing with acidified water;
    washing with acetone; and
    drying in an oven at less than ambient pressure.

13. The process according to claim 9, additionally dissolving salts of a metal ion selected from the group consisting of Co(II), Ni(II), and mixtures thereof in said basic solution of a polyol, and additionally recovering a precipitate of said metal ion.

14. The process according to claim 9, wherein said salts are selected from the group consisting of chloride salts, acetate salts, and mixtures thereof.

15. The process according to claim 9, wherein said basic solution of a simple alcohol comprises sodium hydroxide or potassium hydroxide.

16. The process according to claim 9, wherein said basic solution of a simple alcohol is the sole reducing agent for said Fe(II).

* * * * *